W. E. JENKINS.
Locking Device for Can-Lid.
No. 206,879.  Patented Aug. 13, 1878.
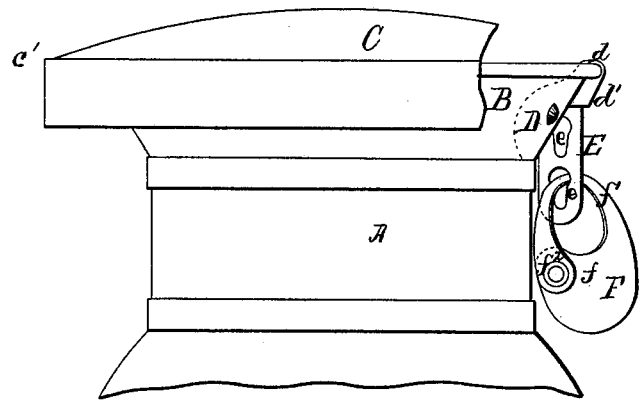
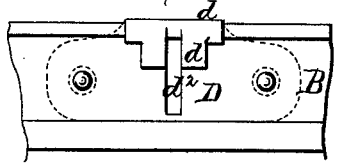
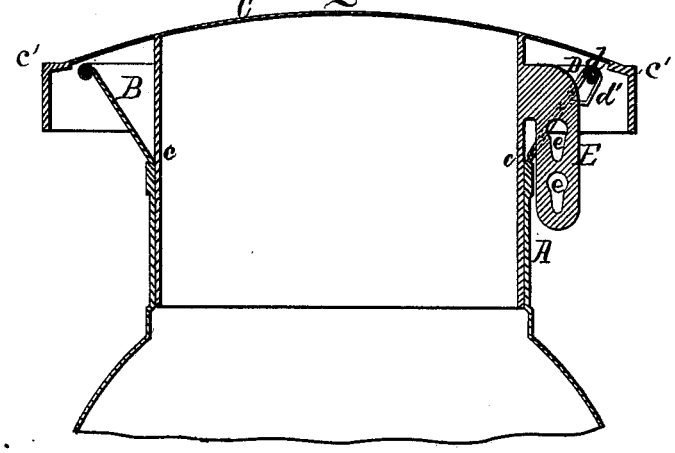
Witnesses:
Theodore B. Hoster
B. S. Clark
Inventor:
William E. Jenkins
By Fitch & Fitch
Attys.

UNITED STATES PATENT OFFICE.

WILLIAM E. JENKINS, OF WARWICK, NEW YORK.

IMPROVEMENT IN LOCKING DEVICES FOR CAN-LIDS.

Specification forming part of Letters Patent No. 206,879, dated August 13, 1878; application filed April 24, 1878.

*To all whom it may concern:*

Be it known that I, WILLIAM E. JENKINS, of Warwick, Orange county, in the State of New York, am the inventor of an Improved Locking Device for Can-Lids, of which the following is a full, clear, and exact description, reference being had to the accompanying drawings, forming part of this specification, in which—

Figure 1 is a side elevation of the bowl and lid or cover of a can embodying my invention. Fig. 2 is a vertical central sectional view of the same. Fig. 3 is a face view of the seal which I preferably employ in connection with my locking device; and Fig. 4 is a side elevation of a part of the rim of the bowl, showing the re-enforcing plate and slot.

My invention relates to a device for securely locking the cover of a can to the rim or bowl thereof, so that it cannot be detached without injuring the can or dismembering a part or parts of the locking device; and my invention is particularly adapted for use upon milk-cans; and it consists in a slot in the rim of the bowl, the bowl being re-enforced about the slot, as hereinafter set forth, and a hasp fixed upon the exterior of the cylindrical flange of the cover, adapted to pass through the slot in the bowl, and to be there secured by a suitable seal or locking device passed through an aperture in the said hasp, as hereinafter more at length described, and recited in the claim.

A is the neck of the can. B is the bowl. C is the cover. Upon the inside of the bowl is placed the re-enforcing plate D, which may be soldered and riveted in place, as shown. A portion of this plate is turned over the rim of the bowl, as at $d$, and brought down upon the outside of the bowl, where it is fastened, and forms a projecting shoulder, $d^1$, as shown. Through the re-enforced portion of the bowl is cut the slot $d^2$, as shown.

Upon the cylindrical flange $c$ of the cover, which when the cover is closed upon the bowl fits into the neck of the can, as is usual, I place the arm or hasp E. This hasp is secured upon the exterior of the flange $c$, near the upper end or junction of said flange and the projecting lid $c'$. It is turned or curved downward, as shown, and is adapted in shape and size to pass through the slot $d^2$ and extend below it, when the cover is inserted into the neck of the can. The hasp is provided with one or more lateral apertures, $e$, as shown.

Now, it is evident that when the cover is placed on the can, the hasp E being passed through the slot in the bowl, the cover may be locked securely to the can by means of a suitable device, such as a padlock fastened to the hasp through the aperture $e$, and that the plate D will, as arranged, re-enforce and strengthen the bowl about the slot $d^2$, where the wear will be the greatest.

At F is shown the device which I prefer to employ to lock the hasp in the slot of the bowl. It consists of a body, $f$, and an arm or tape, $f^1$, secured thereto or forming part thereof, projecting from the body at one corner thereof. This body and arm I form of thin flexible metal, such as copper or tin, so that it may be easily bent. In an aperture in the body I fix the eyelet $f^2$, and I form an opening in the free end of the arm, adapted to fit over the shank of the eyelet. Now the end of the arm may be passed through one of the apertures in the hasp, when the cover is placed on the can, and said arm may be then bent to bring the opening in its free end over the eyelet in the body, as stated, when the eyelet may be flattened and the free end of the arm thus secured to the body. The device F will thus constitute a seal or locking device, and will prevent the hasp from passing back through the slot $d^2$ without cutting or dismembering the arm $f^1$.

What I claim as my invention, and desire to secure by Letters Patent, is—

In a can, the combination of the neck A, carrying the bowl B, with re-enforcing plate D and slot $d^2$, the cover C, with its flange $c$, carrying downwardly-turned hasp E, having apertures $e$, together with the locking device F, of thin flexible metal, and having the body $f$, arm $f^1$, and eyelet $f^2$, arranged to operate as and for the purpose specified.

WILLIAM E. JENKINS.

Witnesses:
JOHN J. BEATTIE,
JOHN C. NAIL.